No. 864,202. PATENTED AUG. 27, 1907.
J. SIMMONS.
BICYCLE STANDARD.
APPLICATION FILED DEC. 24, 1906.
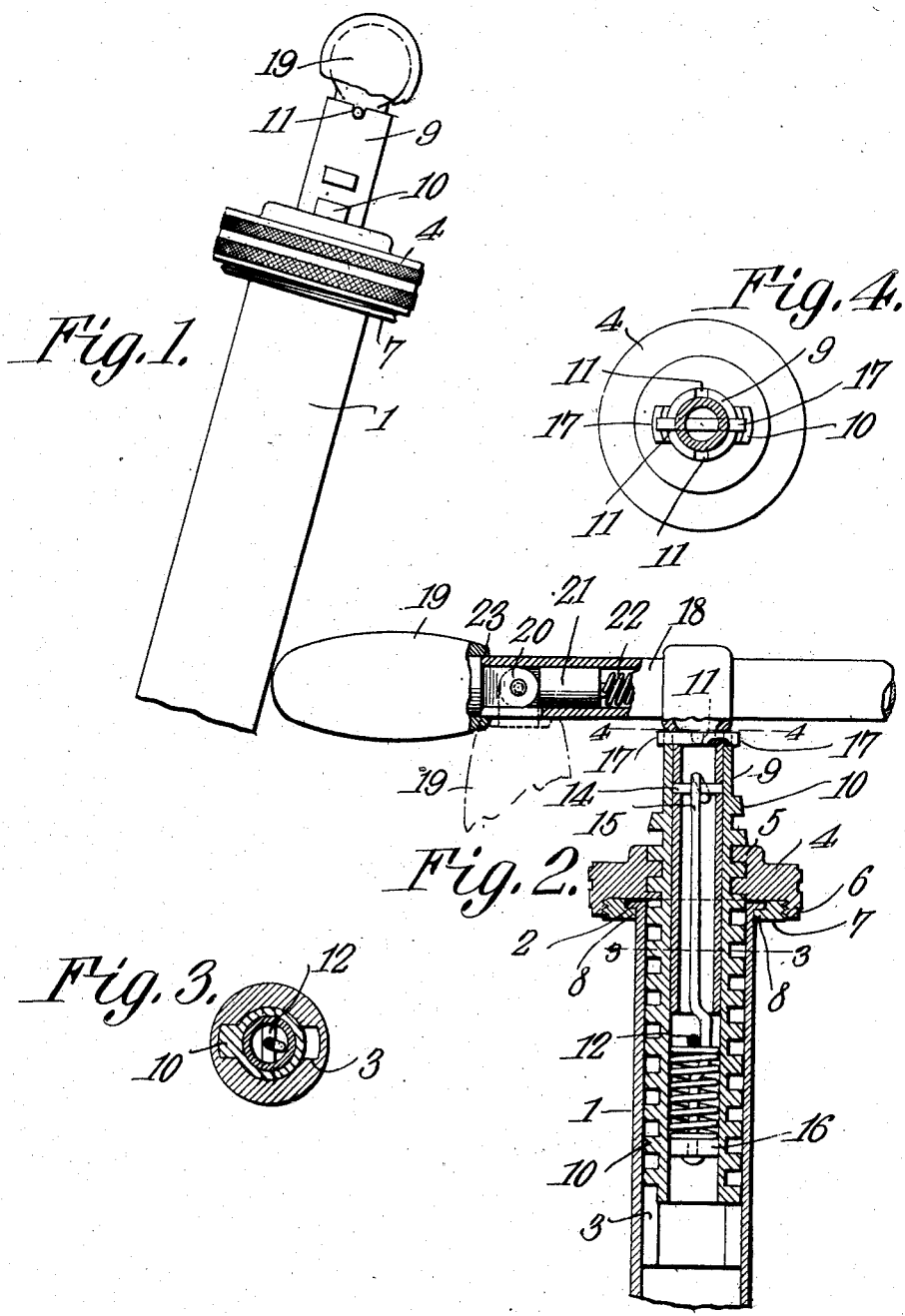
James Simmons,
INVENTOR.
WITNESSES:
By
ATTORNEYS

UNITED STATES PATENT OFFICE.

JAMES SIMMONS, OF LONG BRANCH, NEW JERSEY.

BICYCLE-STANDARD.

No. 864,202.     Specification of Letters Patent.     Patented Aug. 27, 1907.

Application filed December 24, 1906. Serial No. 349,301.

*To all whom it may concern:*

Be it known that I, JAMES SIMMONS, a citizen of the United States, residing at Long Branch, in the county of Monmouth and State of New Jersey, have invented a new and useful Bicycle-Standard, of which the following is a specification.

This invention relates to standards, and the object of the invention is to provide a standard that is suitable for the support of bicycle seats or handle bars, that may be easily operated by hand without the aid of a wrench or other tool and that is adapted to retain the handle bar or seat in a fixed alinement either longitudinally or transversely of the wheel at the will of the operator.

The object of the invention is accomplished in the construction hereinafter described and shown in the accompanying drawing in which Figure 1 is a side elevation of the device as applied to the handle bar of a bicycle; Fig. 2 is a longitudinal section of the same; Fig. 3 is transverse section on line 3—3 of Fig. 2; and Fig. 4 is a transverse section on line 4—4 of Fig. 2.

The invention comprises broadly three telescoping tubes and means for securing these tubes in various positions relative to each other. Between the outer tube and the intermediate tube means are provided to effect a longitudinal adjustment of one tube within the other, and between the intermediate tube and the inner tube means are provided to effect the adjustment of the inner tube in various positions of rotation with respect to its containing tube.

Referring to the drawings, the outer tube 1 has an outwardly flanged end 2 and longitudinal internal grooves or keyways 3. The nut 4 having internal threads 5 and an internally-threaded inwardly-extending flange 6 is held in loose engagement with the end of the outer tube by means of the externally-threaded washer 7 which engages at its outer periphery with the flange of the nut and has an internal annular flange 8 engaging with the flange of the outer tube. Fitting within said outer tube is the intermediate tube 9 provided with longitudinal toothed sections or racks 10 engaging with the said nut and fitting into the said grooves 3 of the outer tube. This intermediate tube has slots 11 at its outer end and a stop bar 12 intermediate of its length. Fitting within said intermediate tube is the inner tube which extends normally from the outer edge of its containing tube to a point outside of the stop bar 12. This inner tube is secured in position by an elastic connection comprising the transverse rod 14 fixed to the tube, the tie rod 15 fixed at one end to the said transverse rod and extending inwardly beyond the inner extremity of the tube and being attached at its inner end to a retaining washer 16 sliding within the intermediate tube, and a spiral spring confined between said washer and the said stop bar 12 of said intermediate tube. The outer end of said inner tube is provided with laterally-extending arms or projections 17 which are adapted to engage with the said grooves 11 of the intermediate tube and to be held in engagement by said spiral spring.

When the device is applied to form a bicycle handle-bar support the outer tube forms part of the frame of the bicycle and the inner tube constitutes the handle-bar supporting post. The advantages to be derived by this construction are that the bar may be readily adjusted and secured vertically by the rotation of the nut and will be kept in fixed alinement in the usual position transversely of the wheel, but by withdrawing the bar a short distance against the action of its flexible connection it may be rotated through a quarter of a turn and put into engagement with corresponding slots so that it will lie longitudinally of the wheel and adapt the bicycle to be passed conveniently through narrow spaces, or to be hung up, or to be rested against side walls.

It is obvious that when this device is to be used as a bicycle seat support the inner tube may be omitted and the intermediate tube used as the seat post.

In Fig. 2 the tubular handle bar 18 is shown constructed in accordance with this invention with a telescoping grip 19 which is connected by a halved together joint 20 to the solid cylinder, or tube with a solid outer end, 21, sliding within the handle bar. The cylinder 21 is slidably secured within the handle by means of the spiral spring 22. The said grip 19 is provided with an annular groove 23 in the inner end thereof adapted to receive the outer end of the tubular handle bar. The advantage of this construction is that the grip may be withdrawn from the bar until its joint extends beyond the edge of the bar, and the grip may then be turned at right angles to the bar and may be held in various positions of rotation by means of notches suitably placed at the end of the bar and adapted to receive the jointed edge of the grip.

Having thus fully described the invention, what is claimed and desired to be secured by Letters Patent is:—

1. A standard comprising an outer tube having an outwardly-flanged end and internal longitudinal slots, an inner tube slidably mounted within said outer tube and provided with external toothed rack sections sliding within said slots, a nut engaging said rack sections and having an inwardly-extending annular flange, and an externally-threaded washer engaging the flange of the nut and having an internal flange engaging the flanged end of said outer tube and loosely securing the said nut about the flanged end of said outer tube.

2. A standard comprising an outer member, an intermediate member slidably mounted in said outer member and secured against rotation, an inner member rotatably mounted in said intermediate member, and means for securing said inner member in various positions of rotation.

3. A standard comprising an outer tube, an intermediate tube slidably mounted in said outer tube but fixed against rotation, an inner tube rotatably mounted in said intermediate tube, and means for securing said intermediate tube in various longitudinal positions and said inner tube in various positions of rotation in said intermediate tube.

4. A standard comprising an outer tube, an intermediate tube slidably and adjustably mounted in said outer tube but fixed against rotation, an inner tube rotatably mounted in said intermediate tube and slidably secured thereto, and means to secure said inner tube in various positions of rotation in said intermediate tube, said means consisting of studs or projections upon one tube engaging with slots in the other tube.

5. A standard comprising an outer tube, an intermediate tube slidably and adjustably mounted in said outer tube but fixed against rotation, an inner tube slidably and rotatably mounted in said intermediate tube, and means for securing said inner tube in various positions of rotation, said means consisting of a stud or projection upon one tube and slots in the other tube and a flexible connection between the two tubes for holding the stud in engagement with one of said slots.

6. A standard comprising an outer tube and a longitudinally slidable inner tube rotatably mounted therein, a projection upon one tube, slots in the other tube and an elastic connection between the two tubes whereby said inner tube is secured in positions of rotation in said outer tube corresponding to the positions of said slots.

7. A standard comprising an outer tube having internal longitudinal grooves, a nut loosely mounted at one end thereof, a longitudinally-slidable intermediate tube mounted in said outer tube and having longitudinal external projections engaging with said grooves and a threaded surface engaging with said nut, and an inner tube rotatably mounted in said intermediate tube, a projection upon said inner tube and slots in the end of said outer tube, and an elastic connection between said inner and intermediate tubes whereby said inner tube may be secured in positions of rotation in said intermediate tube corresponding to the position of said slots.

In testimony that I claim the foregoing as my own, I have hereto affixed my signature in the presence of two witnesses.

JAMES SIMMONS.

Witnesses:
   W. A. SOMERVILLE,
   CHAS. T. PAXON.